United States Patent
Herttua et al.

(10) Patent No.: US 9,596,185 B2
(45) Date of Patent: Mar. 14, 2017

(54) SELECTION OF DATA OFFER

(71) Applicant: Rovio Entertainment Ltd, Espoo (FI)

(72) Inventors: Timo Herttua, Espoo (FI); Ossi Tiltti, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 276 days.

(21) Appl. No.: 14/287,232

(22) Filed: May 27, 2014

(65) Prior Publication Data

US 2015/0350088 A1    Dec. 3, 2015

(51) Int. Cl.

| | |
|---|---|
| *H04W 12/06* | (2009.01) |
| *H04W 28/24* | (2009.01) |
| *H04L 12/801* | (2013.01) |
| *H04L 12/811* | (2013.01) |
| *H04L 29/08* | (2006.01) |
| *H04L 29/06* | (2006.01) |
| *H04W 12/00* | (2009.01) |
| *H04L 12/851* | (2013.01) |

(52) U.S. Cl.
CPC .............. *H04L 47/18* (2013.01); *H04L 47/38* (2013.01); *H04L 63/0807* (2013.01); *H04L 65/80* (2013.01); *H04L 67/322* (2013.01); *H04W 12/00* (2013.01); *H04W 12/06* (2013.01); *H04W 28/24* (2013.01); *H04L 47/24* (2013.01)

(58) Field of Classification Search
CPC ....... H04L 47/18; H04L 67/322; H04L 65/80; H04L 47/38; H04L 63/0807; H04L 47/24; H04W 28/24; H04W 12/06; H04W 12/00
See application file for complete search history.

(56) References Cited

U.S. PATENT DOCUMENTS

| | | | | |
|---|---|---|---|---|
| 7,263,095 | B1 * | 8/2007 | Sarkar | H04L 12/5695 370/352 |
| 8,159,520 | B1 * | 4/2012 | Dhanoa | H04N 7/148 348/14.02 |
| 2005/0058068 | A1 * | 3/2005 | Ben Ali | H04L 12/5695 370/230 |
| 2009/0222283 | A1 * | 9/2009 | Lassetter | G06Q 50/22 705/2 |
| 2011/0119735 | A1 * | 5/2011 | Higuchi | H04L 63/08 726/3 |
| 2011/0302289 | A1 * | 12/2011 | Shaikh | H04L 29/12216 709/223 |
| 2011/0305208 | A1 * | 12/2011 | Wu | H04W 72/1247 370/329 |
| 2012/0060031 | A1 | 3/2012 | Huang et al. | |

(Continued)

FOREIGN PATENT DOCUMENTS

WO    WO2009067156 A2    5/2000

*Primary Examiner* — Omar Ghowrwal

(74) *Attorney, Agent, or Firm* — Squire Patton Boggs (US) LLP

(57) ABSTRACT

According to an example embodiment of the present invention, there is provided an apparatus configured at least to determine a maximum data quality that is to be offered to a user equipment, compile an offer comprising at least an identifier of a first data item, a quality level of the first data item being at most the maximum data quality, wherein the maximum data quality is determined at least in part based on an access token received from the user equipment.

19 Claims, 6 Drawing Sheets

(56) References Cited

U.S. PATENT DOCUMENTS

| | | | |
|---|---|---|---|
| 2012/0196566 A1* | 8/2012 | Lee .................. | H04M 15/80 455/408 |
| 2014/0115159 A1* | 4/2014 | Zisimopoulos ....... | H04W 28/24 709/225 |
| 2015/0049606 A1* | 2/2015 | So ...................... | H04L 47/808 370/230 |
| 2015/0282242 A1* | 10/2015 | Merino Vazquez ............ | H04L 65/1073 370/221 |

* cited by examiner

SELECTION OF DATA OFFER

FIELD OF INVENTION

The present invention relates to management of data communication networks and distribution of data therein. The data may be caused to be distributed using different quality levels.

BACKGROUND OF INVENTION

Quality of service is an aspect of media distribution in networks. For example, a streaming television program may be transmitted from a sender to a receiver using a quality level that corresponds to at least one of a network capacity and a receiver capacity. Alternatively, radio programs, or pre-stored audio, video or audio-visual media files may be streamed.

A network capacity comprises in this regard a capability of an end-to-end connection between the sender and the receiver. In this regard, the end-to-end connection may traverse more than one physical network to convey information between the sender and the receiver. Network capacity may be limited by a single slow link that is comprised in the end-to-end connection, for example where the receiver is a mobile phone, the air interface may have a lower capacity than backbone networks that the end-to-end connection traverses.

Receiver capacity may relate to an ability of a receiver to render the media content. In case processing power at the receiver end is limited, it may be that the receiving unit may not be able to decode a very high quality rendering of the media content and so transmitting at a lower quality level may be more useful.

Data, such as media content, may be conveyed in a network in encoded form. Such encoding may comprise, for example, audio coding or video coding. Examples of audio coding codecs include advanced audio coding, AAC, Nero AAC and advanced multi-band excitation, AMBE. Examples of video coding codecs include moving picture experts group 4, MPEG-4 and windows media video, WMV. Codecs also exist to code still images, such as joint photographic experts group, JPEG, codecs.

A user device seeking a video call, for example, from a network may request the call in connection with codec negotiation. Codec negotiation may comprise the user device indicating which codecs and/or codec versions it supports, and the network selecting from the indicated codecs one it is willing to use to provide the media content. Subsequent to codec selection, a bitrate used in a connection may be set to a constant value, or the bitrate may be adapted opportunistically based on variation of end-to-end capacity.

SUMMARY OF THE INVENTION

According to a first aspect of the present invention, there is provided an apparatus comprising at least one processing core, at least one memory including computer program code, the at least one memory and the computer program code being configured to, with the at least one processing core, cause the apparatus at least to determine a maximum data quality that is to be offered to a user equipment, compile an offer comprising at least an identifier of a first data item, a quality level of the first data item being at most the maximum data quality, wherein the maximum data quality is determined at least in part based on an access token received from the user equipment.

Various embodiments of the first aspect may comprise at least one feature from the following bulleted list:

- the at least one memory and the computer program code are configured to, with the at least one processing core, further cause the apparatus to verify the access token before determining the maximum data quality
- the at least one memory and the computer program code are configured to, with the at least one processing core, cause the apparatus to verify the access token by inquiring from a first server, whether the first server has issued the token
- the at least one memory and the computer program code are configured to, with the at least one processing core, cause the apparatus to verify the access token by checking whether the access token satisfies a mathematical criterion
- the mathematical criterion comprises that the access token has a valid cryptographic signature
- the at least one memory and the computer program code are configured to, with the at least one processing core, cause the apparatus to determine the maximum data quality based at least in part on a message exchange with a second server, the message exchange comprising transmission of the access token from the apparatus to the second server and receipt from the second server of a service class indication
- the at least one memory and the computer program code are configured to, with the at least one processing core, cause the apparatus to include in the offer a plurality of identifiers of data items, each identifier relating to exactly one data item
- no data item the identifier of which is included in the offer has a data quality superior to the data quality of the first data item
- the identifier of the first data item comprises a hyperlink to the first data item.

According to a second aspect of the present invention, there is provided an apparatus comprising at least one processing core, at least one memory including computer program code, the at least one memory and the computer program code being configured to, with the at least one processing core, cause the apparatus at least to transmit a first request message to a first server, receive a response from the first server, the response comprising an access token, transmit a second request message to a second server, the second request message comprising the access token, and receive an offer from the second server, the offer comprising at least an identifier of a first data item.

Various embodiments of the second aspect may comprise at least one feature from the following bulleted list:

- the at least one memory and the computer program code are configured to, with the at least one processing core, further cause the apparatus to request, using the identifier, the first data item to be provided to the apparatus.
- the at least one memory and the computer program code are configured to, with the at least one processing core, further cause the apparatus to determine whether contents of the offer are still valid or already expired.

According to a third aspect of the present invention, there is provided a method comprising determining a maximum data quality that is to be offered to a user equipment, compiling an offer comprising at least an identifier of a first data item, a quality level of the first data item being at most the maximum data quality, wherein the maximum data quality is determined at least in part based on an access token received from the user equipment.

Various embodiments of the third aspect may comprise at least one feature corresponding to a feature comprised in the bulleted list laid out above in connection with the first aspect.

According to a fourth aspect of the present invention, there is provided a method comprising transmitting a first request message to a first server, receiving a response from the first server, the response comprising an access token, transmitting a second request message to a second server, the second request message comprising the access token, and receiving an offer from the second server, the offer comprising at least an identifier of a first data item.

Various embodiments of the fourth aspect may comprise at least one feature corresponding to a feature comprised in the bulleted list laid out above in connection with the second aspect.

According to a fifth aspect of the present invention, there is provided an apparatus comprising means for determining a maximum data quality that is to be offered to a user equipment, means for compiling an offer comprising at least an identifier of a first data item, a quality level of the first data item being at most the maximum data quality, wherein the maximum data quality is determined at least in part based on an access token received from the user equipment.

According to a sixth aspect of the present invention, there is provided an apparatus comprising means for transmitting a first request message to a first server, means for receiving a response from the first server, the response comprising an access token, means for transmitting a second request message to a second server, the second request message comprising the access token, and means for receiving an offer from the second server, the offer comprising at least an identifier of a first data item.

According to a seventh aspect of the present invention, there is provided a non-transitory computer readable medium having stored thereon a set of computer readable instructions that, when executed by at least one processor, cause an apparatus to at least determine a maximum data quality that is to be offered to a user equipment, compile an offer comprising at least an identifier of a first data item, a quality level of the first data item being at most the maximum data quality, wherein the maximum data quality is determined at least in part based on an access token received from the user equipment.

According to an eighth aspect of the present invention, there is provided a non-transitory computer readable medium having stored thereon a set of computer readable instructions that, when executed by at least one processor, cause an apparatus to at least transmit a first request message to a first server, receive a response from the first server, the response comprising an access token, transmit a second request message to a second server, the second request message comprising the access token, and receive an offer from the second server, the offer comprising at least an identifier of a first data item

INDUSTRIAL APPLICABILITY

At least some embodiments of the present invention enable efficient use of network resources so that a maximum number of terminal devices are enabled to use. Differing use requirements may be catered to.

DETAILED DESCRIPTION OF EXAMPLE EMBODIMENTS

Capping a data quality based on user depending on a user class may enable more efficient use of a network, as data is not provided with an unnecessarily high quality which would consume network resourced unnecessarily. User equipments may be provided with data at a quality they need to operate or which is otherwise seen as appropriate.

Figure 1:
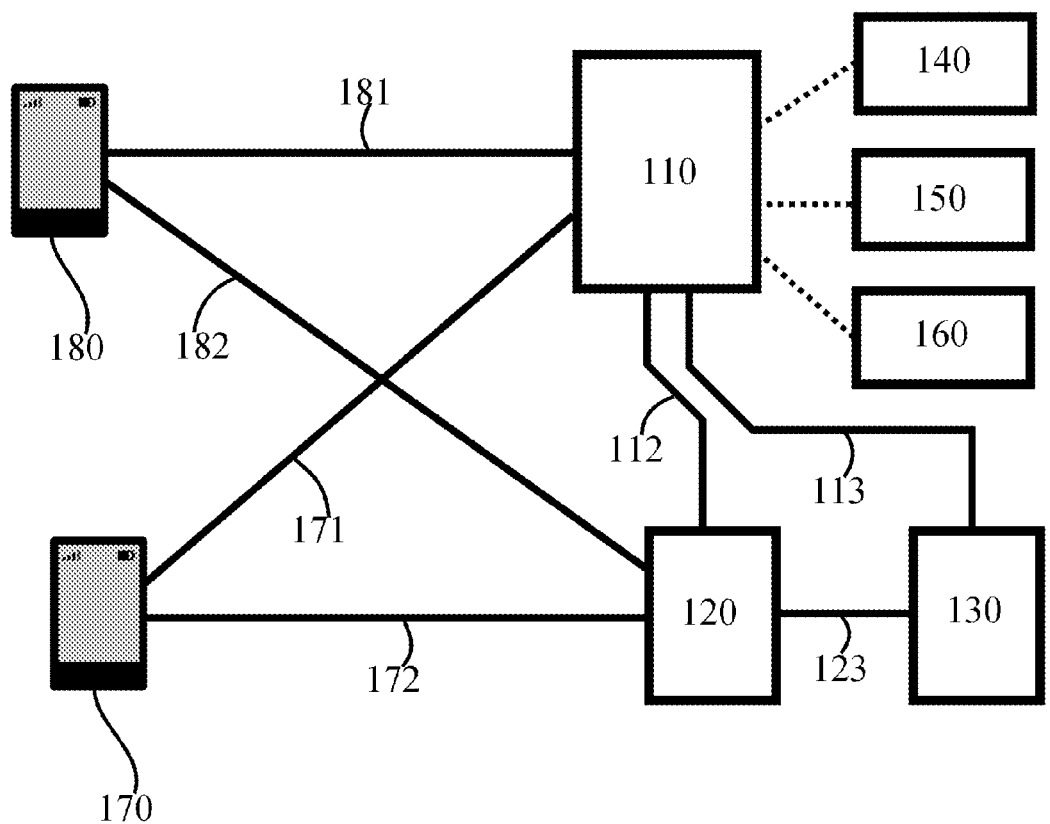
FIG. 1 illustrates a first example system capable of supporting at least some embodiments of the present invention.

FIG. 1 illustrates a first example system capable of supporting at least some embodiments of the present invention. Server 110 may comprise a data server, video server, data distribution server or a video distribution server, for example. A video server may be configured to provide streaming video, for example. A video distribution server may be configured to provide information enabling, at least in part, video streams to be obtained. Such information may comprise identifiers such as hyperlinks to video streak files, wherein such video stream files need not be stored on server 110. Another example of identifier is a content identifier in a video or other media server, which may comprise a numerical code, for example, to be used with the server to obtain the video or other media content item.

Entities 140, 150 and 160 represent storage of a data content item at different quality levels. For example, entity 140 may represent storage of a video file at high density, HD, resolution, entity 150 storage of the same video content at an intermediate resolution, and entity 160 storage of the same video content at a low resolution. An example of intermediate resolution is 360p resolution. An example of low resolution is 240p resolution. It is understood by a person skilled in the art that resolution amount defining high and low resolution may vary and for example what is currently defined as high resolution may in future be defined as low resolution. Alternatively, entities 140, 150 and 160 may represent storage of audio or other content at high, intermediate and low quality level, respectively. The dotted lines connecting entities 140, 150 and 160 with server 110 may represent either server 110 knowing an identifier of each of elements 140, 150 and 160 or server 110 storing the data represented by entity 140, 150 and 160, for example.

Server 120 may comprise an identity or ecosystem server, for example. An ecosystem may refer, at least, to, for example, a digital ecosystem, software ecosystem and/or cloud ecosystem. In an ecosystem there may be independent components that have technical features, such as for example servers and user equipments, and these components, or a subset of those may interact with each other to enable various services. Server 120 may be configured to receive requests from user equipments, and to respond to such requests by providing an access token. Such access tokens may be specific to a user, to a user equipment or to a combination of user and user equipment, for example. Server 120 may be configured to operate as part of an ecosystem hosting a plurality of services. An identity of a user, user equipment or user-user equipment pair may be shared between services comprised in the ecosystem. Server 120 may be configured to coordinate, at least in part, access to at least one service comprised in the ecosystem. Server 120 may be configured to verify, that a user transmitting a request to server 120 has access rights to the requested service. Server 120 may, additionally or alternatively, be configured to fetch information concerning the user from further at least one data source, such as for example at least one further server, which is not illustrated in FIG. 1. Fetched information concerning the user may comprise, for example, age, location and gender.

An identity may comprise, for example, a name of a user, a combination of a user name and a password, a reference number assigned to a user, an IP address, a serial number of a user equipment or a combination of at least two of these. An identity can be used for example, to identify uniquely a user, a user equipment or a combination of both.

A user equipment may comprise a computer, such as for example a laptop, desktop or tablet computer. A user equipment may comprise a mobile device such as a mobile phone, smartphone, phablet or personal digital assistant, PDA, device, for example. A user equipment may comprise a media device such as a set-top box, videopad or personal audio device, for example.

Server 110 may be co-located with server 120 or the two servers may be located in different locations. Server 110 and server 120 may be processes in one physical server, or they may be physically distinct servers. Server 110 and server 120 may be physical servers or they may be software programs.

Server 130 may comprise a segmentation server. Server 130 may be configured to receive from server 120 requests for segmentation information relating to an identity, such as for example an identity of a user, user equipment or user-user equipment pair. Server 130 may be configured to, responsively, provide the requested segmentation information. Segmentation information may comprise, for example, a user class. User class may be expressed as an integer between 1 and 3, for example. The user class may be indicative at least of a maximum data quality the user is to be provided with. Server 130 may communicate with server 120 via connection 123. In some embodiments, server 130 is configured to provide to server 120 segmentation information enabling server 120 to determine a user class based at least in part on a received identity without querying server 110 with the received identity. Such provided segmentation information may be updated by server 130, for example based on a network congestion level.

Segmentation may be based on at least one input value. For example, server 130 or server 120 may look-up a user class using an identity provided by server 120 or user equipment 170 as an input value to a look-up table. Alternatively or additionally, server 130 or server 120 may determine a user class associated with the identity. Alternatively or additionally, server 130 or server 120 may determine the user class based at least in part on an IP address associated with the identity. Alternatively or additionally, server 130 or server 120 may determine a geographical area or location where the identity is located and used that, at least in part, as basis for determining the user class. Geographical area may be used in one of different scales of granularity, for example depending on a country, state or city where a user is located in. Alternatively or additionally, server 130 or server 120 may determine the user class at least in part based on characteristics of user equipment 170, which may be provided by user equipment 170 in the request sent to server 120, and from server 120 to server 130. For example, a screen resolution and/or processor capacity may affect an ability of the user equipment to user data. For example, server 130 may determine that users in a low-income area, such as for example a low-income country, may benefit from a lower data quality than users in high-income areas. Devices in low-income areas may be less capable of rendering highly intensive data formats such as HD video.

The segmentation information may disclose or enable determining a user class indicating a subscription level. A high-level subscription, which may be more expensive, may unlock higher data qualities for access. Lower-level subscriptions, which may be cheaper to obtain than a high-level subscription, may only unlock lower data qualities for access.

Having different data qualities available for different segmentations may have the benefit of saving data transfer capacity of the respective network through which the data is transferred. This enables for example better likelihood of having enough free capacity in the data transfer network in case of an emergency.

Where a set of user equipments comprises military equipments, segmentation information and/or user class may be based on military ranks of users. Low-ranking personnel need more coarse information to perform their tasks, so providing more detailed information to them would waste network capacity. Higher-ranking personnel, such as general officers, on the other hand may benefit from high-density information to assist in decision-making, wherein such high-density information may also comprise elements classified as secret. Therefore, a situational data file, for example, may be prepared in a plurality of data intensity levels, the lower-intensity versions being accessible to all ranks and the higher-intensity versions being restricted in access based on rank. Data intensity levels may be considered to be data quality levels.

Server 130 may be disposed in the same physical server device as server 120, or alternatively it may be a distinct apparatus such that server 130 is external to server 120 and server 120 is external to server 130.

In use, user equipment 170 may initially contact server 120 by transmitting a request, the request comprising an identity as described above. The request may be transmitted over connection 172, which may traverse a plurality of interconnected networks, or alternatively only nodes of one single network.

Responsive to receiving the request from user equipment 170, server 120 may determine segmentation information and/or user class for user equipment 170. Server 120 may determine the segmentation information and/or user class internally using logic disposed in server 120, or server 120 may inquire from server 130 what the segmentation information and/or user class of user equipment 170 is. In case server 120 inquires from server 130, it may do so via connection 123. Once in possession of the segmentation information and/or user class, server 120 may prepare an access token.

In general, an access token may be specific to the user of user equipment 170, to user equipment 170 or to a combination of the two. The access token may be prepared, at least in part, using cryptographic methods. For example, server 120 may furnish the access token with a signature of itself, using a private key of server 120. The access token may be encrypted, for example with a public key of server 110 or a secret key shared between server 120 and server 110. Using a cryptographic method such as signature and/or encryption provides the benefit that user equipments are prevented from requesting, by accident or by intent, quality versions of data content items that are of unnecessarily high quality for them. In some cases, they may be prevented from requesting versions that comprise information users of the user equipments are not authorized to see. Another benefit is that users do not even find out they are not accessing the highest-quality version available, which may increase user satisfaction. It may also be beneficial that in this way the access token is valid only for the user of user equipment 170, the user equipment 170 or to the combination of both. Thus no other user, user equipment or a combination of both can utilize the access token.

The access token may indicate a maximum data quality level available for the user of the user equipment 170, the user equipment 170 or the combination of both. Additionally or alternatively, the access token may indicate the subscription type, user class, user location or other segmentation basis. In some embodiments, the access token does not in itself indicate a maximum data quality level or comprise segmentation information, but only a value, which may be randomly generated. In this case, server 120 or server 130 may store an association between the value and the maximum data quality level or user class. The access token may take the form of a data file, binary sequence or character string, for example.

Server 120 may be configured to transmit, as a response, a message comprising the access token to user equipment 170, for example over connection 172. Subsequent to receipt of this message, user equipment 170 may request from server 110 a data content item, wherein user equipment 170 may include in this request at least the access token. This request may be transmitted to server 110 via connection 171. User equipment 170 may provide server 110 an identifier of the requested data content item, for example in the same message as the access token. Alternatively, a different message may be used.

Server 110 may be configured to compile an offer to user equipment 170. The offer may comprise identifiers of more than one version of the requested data content item, such as for example more than one quality version. For example, where user equipment 170 is associated with a high-level subscription, server 110 may include in the offer identifiers of all the quality versions of the requested data content item it knows. In such a case, it may be possible then that the user may select the quality version of the requested data content item that is to be used. Server 110 may decide on the identifiers to include in the offer based at least in part on the access token. The access token may indicate the subscription type, user class, user location or other segmentation basis, or alternatively the access token may indicate a maximum data quality level decided based on the segmentation information in server 130 or server 120. Server 110 may then select identifiers of the quality versions of the requested data content item so that the identifiers in the compiled offer all refer to quality versions that are at most at the maximum data quality level. To this end, server 110 may omit from the offer identifiers that relate to quality versions of the requested data content item the quality of which exceeds the maximum data quality available for the user of the user equipment 170, the user equipment 170 or the combination of both.

The offer may conform to at least one of javascript object notation, json, manifest and hypertext transfer protocol, http, live streaming, HLS, format. Other possible formats include "YAML ain't markup language", YAML, MPEG dynamic adaptive streaming over hypertext markup language, MPEG-DASH, and extensible markup language, XML.

Server 110 may be configured to verify the access token is proper. Such verification may comprise verifying that a cryptographic signature of server 120 in the access token is valid, for example by using a public key of server 120 that server 110 stores. Such verification may comprise transmitting to server 120, via connection 112, a query as to whether the access token is valid, and receiving a response to the query. In case the access token is determined to not be valid, server 110 may discard the request received from user equipment 170 or transmit an error indication to user equipment 170. Verifying the access token may comprise challenging user equipment 170 with a nonce, and receiving a response from user equipment 170 that user equipment has produced from the nonce and a secret stored in user equipment 170. Where user equipment 170 has cellular communication capability, such a secret may be stored on a subscriber identity module, SIM, card, for example.

In embodiments where the access token comprises a value and no indication of maximum data quality level or segmentation information, server 120 may provide at least one of the maximum data quality level, the segmentation information and the user class in its response to server 110. Alternatively, server 110 may be configured to, responsive to verification the access token is valid, inquire for the maximum data quality level, segmentation information and/or user class from server 130, via connection 113. Server 130 may be configured to responsively provide the requested information.

Once server 110 has compiled the offer, it may transmit it to user equipment 170. User equipment 170 may subsequently, in receipt of the offer, select one of the identifiers comprised in the offer for requesting the data content item in a suitable data quality level. Where the identifiers are hyperlinks, the requesting may comprise following one of the hyperlinks. Where the identifiers are identifiers to data stored in server 110 or another server, the requesting may comprise requesting the data from server 110 or the other server, the request comprising the selected identifier.

User equipment 180 may have a lower-level subscription, or its user may have lower rank. It may be configured to act much like user equipment 170, in particular it may request from server 120 an access token via connection 182, and transmit a request to server 110 via connection 181, this request comprising the access token. The request may be for the same data content item as the request transmitted by user equipment 170, for the same of simplicity but of course user equipment 180 may request a different content item as well.

Server 110 may process the request and compile an offer for user equipment 180, however as user equipment 180 is associated with a lower-level subscription, or a user with lower rank, the offer will not comprise all the identifiers that were present in the offer sent to user equipment 170. In particular, the identifier associated with the highest data quality version of the data content item present in the offer sent to user equipment 170 may be absent in the offer sent to user equipment 180.

User equipments receiving an offer may be configured to display representations of all identifiers comprised in the offer and not display indications of identifiers of quality versions not comprised in the offer. In other words, user equipments and/or their users need not know if they are not receiving the highest quality available.

According to a first use scenario, user equipment 170 initially contacts server 120 by transmitting a request, the request comprising an identity as described above. Responsively, server 120 determines segmentation information and/or a user class for user equipment 170. Server 120 may determine the segmentation information and/or user class internally using logic disposed in server 120, or server 120 may inquire from server 130 what the segmentation information and/or user class of user equipment 170 is. Server 120 then provides user equipment 170 the access token. Subsequent to receipt of the access token, user equipment 170 requests from server 110 a data content item, including in this request the access token. Server 110 then compiles the offer to user equipment 170. The offer comprises identifiers of more than one version of the requested data content item, such as for example more than one quality version. The offered versions are of at most the maximum data quality level associated with the access token. Optionally, server 110 may verify the access token and the maximum data quality level internally in server 110.

According to a second use scenario, user equipment 170 obtains the access token as in the first use scenario and requests the data content item from server 110, using the access token. In the second use scenario, server 110 prepares the offer as in the first use scenario, and verifies the access token is valid by signalling to server 120 and receiving therefrom signalling in response. Optionally, the maximum data quality level may be obtained in server 110 by signalling to server 130 and responsively receiving signalling therefrom.

According to a third use scenario, user class comprises a basic user class or a VIP user class. A user may be classified in to the VIP user class, which receives higher-quality data than the basic user class, based at least in part on a higher price VIP users have chosen to pay. VIP user class may be offered to basic user class users responsive to a determination that they use the service often. Alternatively, users who use the service often may be classified into the VIP user class responsive to the frequency of their use of the service, without charging a premium price. For example, VIP use may cost 2 euros per month, and basic use may be free or cost only 0.50 euros per month.

According to a fourth use scenario, user class is determined by default based on geographical location. In these cases, geographical location may be used as a proxy indicator for quality requirements, for example users in Africa may be given lower data quality by default, as African users are assumed to have user equipments capable of rendering only basic quality content. Optionally, in the fourth scenario, an assigned user class may override the geographic location. For example, a VIP class user in Africa would receive the same data quality as she does when in Germany.

Figure 2:
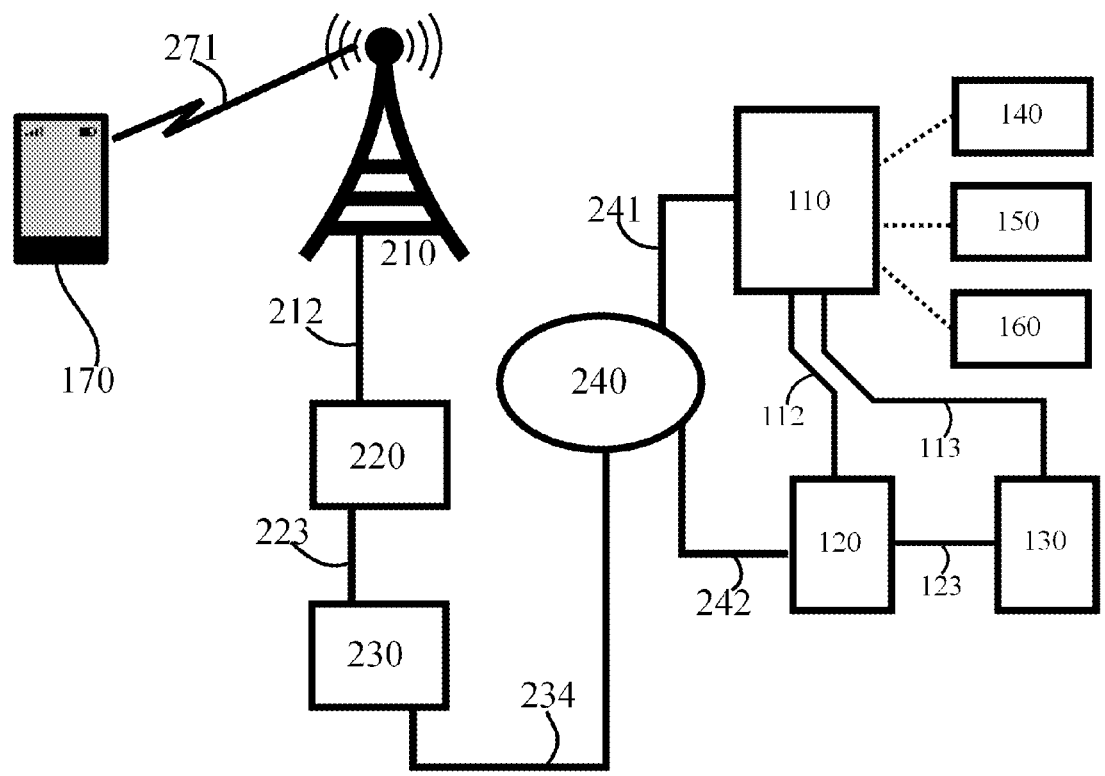
FIG. 2 illustrates a second example system capable of supporting at least some embodiments of the present invention.

FIG. 2 illustrates a second example system capable of supporting at least some embodiments of the present invention. In FIG. 1, the nature of connections 172 and 171 of FIG. 1 is illustrated in more detail. Elements 170, 110, 120, 130, 112, 113, 140, 150 and 160 correspond to similar elements as in FIG. 1.

In FIG. 2, user equipment 170 comprises a smartphone. A connection from user equipment 170 to server 110 may traverse a wireless link 271 interconnecting user equipment 170 to a base station 210, a wire-line connection 212 connecting base station 210 to a first network element 220, a wire-line connection 223 connection first network element 220 to gateway 230, a wire-line connection 234 connecting gateway 230 to network 240, and finally wire-line connection 241 connecting network 240 to server 110. Network 240 may comprise the internet, for example. Likewise a connection from user equipment 170 to server 120 may traverse a similar set of nodes and connections, except for the last leg which may comprise a wire-line connection 242 connecting network 240 to server 120. Connections 112 and 113 may in some embodiments go via network 240.

Figure 3:
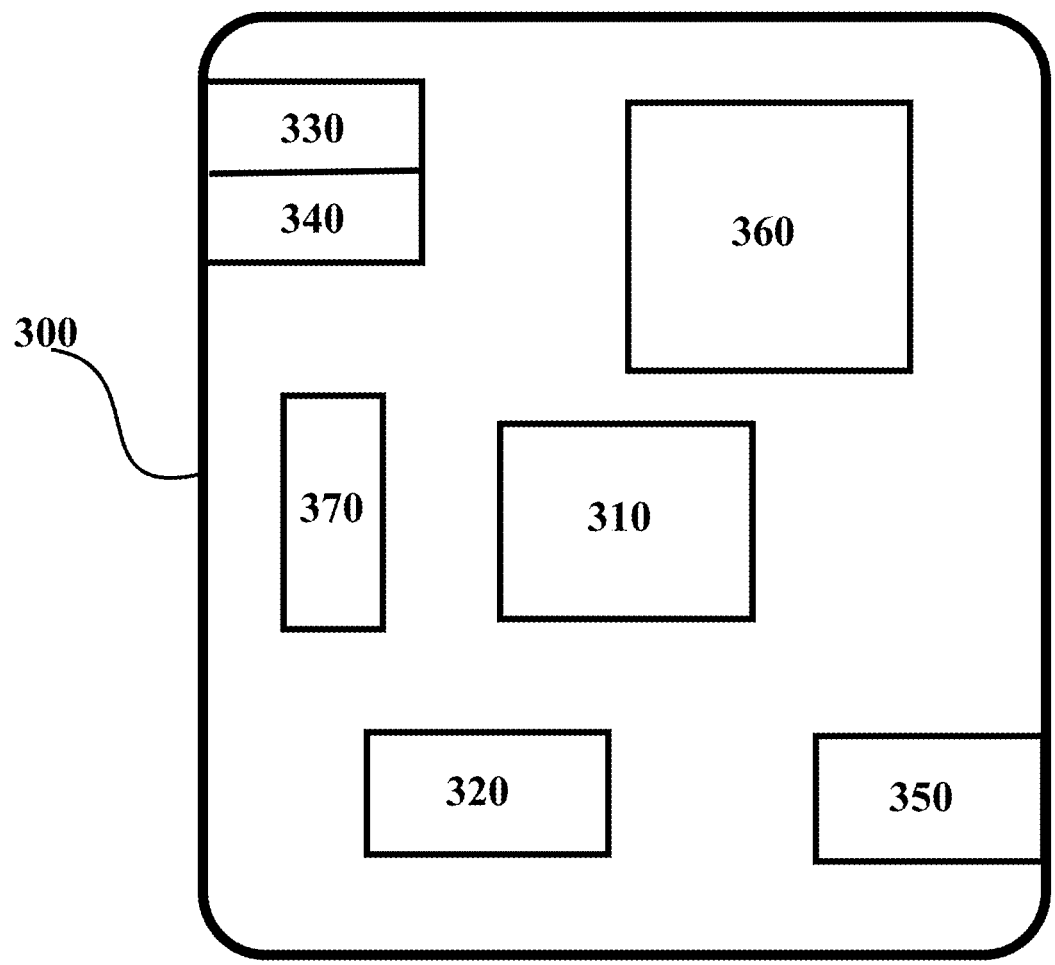
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a user equipment such as user equipment 170 of FIG. 1 or FIG. 2. Alternatively, elements discussed herein may be comprised in an apparatus such as server 110, server 120 or server 130 of FIG. 1, for example. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WIMAX, standards, for example. Where the device is a server, it may comprise simply a wire-line transmitter and receiver.

Device 300 may comprise a near-field communication, NFC, transceiver 350. NFC transceiver 350 may support at least one NFC technology, such as NFC, BLUETOOTH, Wibree or similar technologies. Servers may lack near-field communication.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300. Servers may lack user identity modules.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
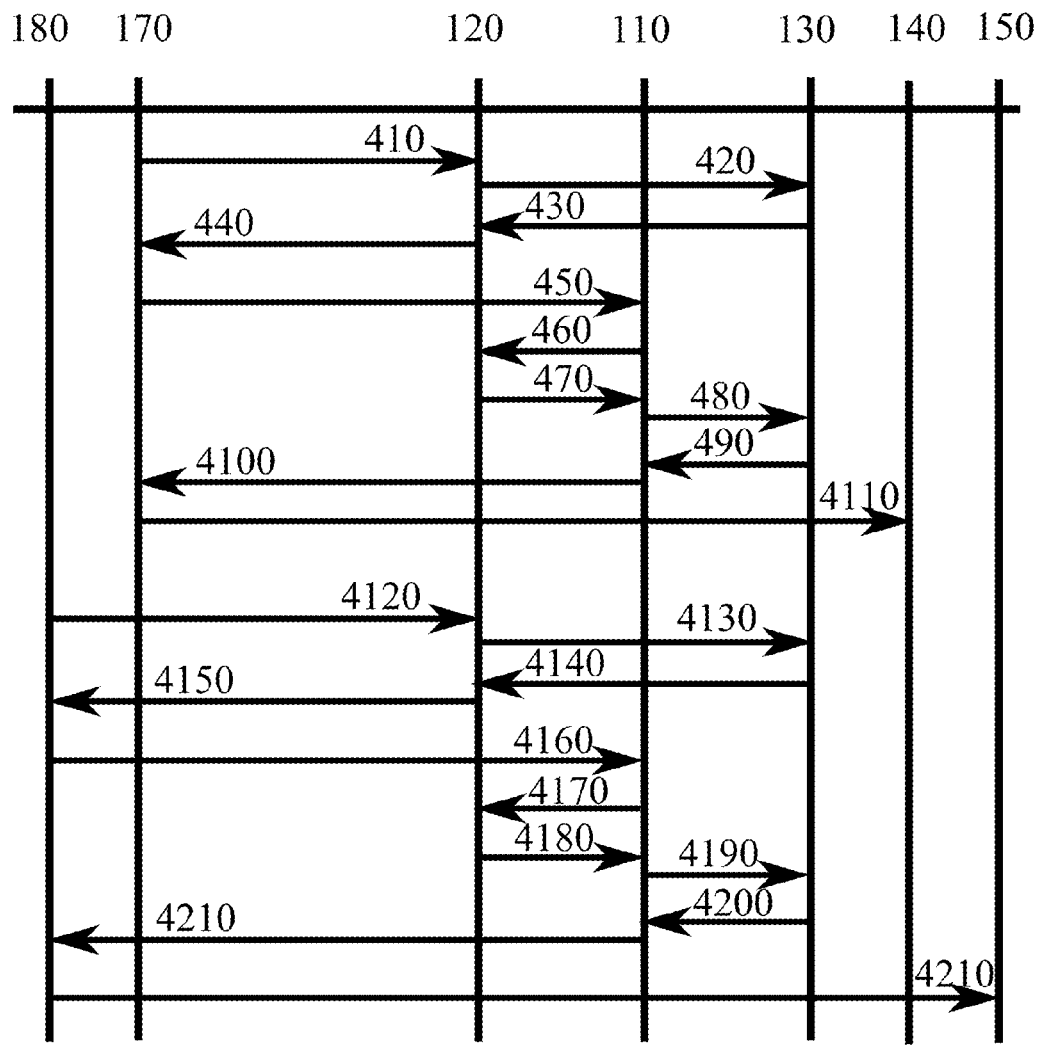
FIG. 4 is a signalling diagram illustrating signalling in accordance with at least some embodiments of the invention.

FIG. 4 is a signalling diagram illustrating signalling in accordance with at least some embodiments of the invention. On the vertical axes are disposed, from left to right, in terms of FIG. 1, user equipment 180, user equipment 170, server 120, server 110, server 130, and finally representations 140 and 150 of storage of a data content item at two different quality levels. Time advances from top toward to bottom.

In phase 410 user equipment 170 transmits a message to server 120, wherein the message may comprise at least one identity, the identity relating to at least one of a user, user equipment 170 and a combination of user and user equipment 170. Responsive to message 410, server 120 may obtain an access token, for example by generating it or requesting it from server 130. Such requesting is illustrated as phase 420, and receipt of the requested access token is illustrated as phase 430. The access token may be obtained based at least in part on segmentation information, wherein the segmentation information may be present in server 120. In case the segmentation information is present in server 120, phases 420 and 430 may be absent. Alternatively, the segmentation information may be present in server 130 and server 120 may obtain the access token by receiving it from server 130. As a yet further alternative, server 120 may receive, in phase 430, the segmentation information from server 130 and generate the access token locally in server 120 based at least in part on the received segmentation information.

In phase 440, server 120 provides the access token to user equipment 170. Once user equipment 170 has the access token, it may request a data content item from server 110, such requesting being illustrated as phase 450. The request of phase 450 may comprise the access token. In phase 460, server 110 may inquire from server 120 whether server 120 has issued the access token, and in phase 470 server 120 may responsively indicate whether it has issued the access token. In case the access token can be verified in server 110 by other ways, phases 460 and 470 may be absent or optional. Also, in case verification of the access token is not done, phases 460 and 470 may be absent. In phase 480 server 110 may request from server 130 at least one of a user class and segmentation information, and server 130 may responsively respond by providing the requested user class and/or segmentation information in phase 490. In embodiments where server 110 can determine from the access token a maximum data quality, phases 480 and 490 may be absent. An example of such an embodiment is one where the access token comprises an indication of the maximum data quality. In such embodiments, server 110 may determine the maximum data quality based on the access token internally in server 110 without consulting nodes external to server 110. Such an access token may be encrypted by server 120, before phase 440. Such encrypting may employ a public key of server 110, or a secret key shared between server 120 and server 110, for example.

Overall server 110 may be configured to determine the maximum data quality based at least in part on the access token. Such determining may comprise, as laid out above, at least in part requesting data from server 120 and/or 130, or determining from the access token without consulting server 120 and/or server 130.

Based on the maximum data quality, obtained at least in part based on the access token, server 110 may compile an offer of different quality versions, or data intensities, of the data content item requested by user equipment 170 in phase 450. For example, the offer may comprise identifiers of versions the storage of which are illustrated with 140 and 150, with 140 representing a higher-quality or higher-data intensity storage. In general the offer may comprise identifiers of all versions the quality, or intensity, of which are at most the determined maximum data quality. The offer is transmitted from server 110 to user equipment 170 in phase 4100.

In phase 4110 user equipment 170, having selected 140 from the offer, requests to be provided with the version the storage of which is represented with 140 in FIG. 4.

Phases 4120-4210 represent a similar process as described above in connection with phases 410-4110. Instead of user equipment 170, user equipment 180 is active in this part of FIG. 4, wherefore the identity included in the message of phase 4120 differs from that included in the message of phase 410. In detail, the identity in phase 4120 corresponds to a user of user equipment 180, user equipment 180 or a combination of user equipment 180 and its user. Correspondingly, the access token included in the messages of phases 4150 and 4160 differs from that included in the messages of phases 4150 and 4160. As the offer is determined based on the maximum quality level, which is determined at least in part based on the access token, the offer of phase 4120 differs from the offer of phase 4100 in case the maximum quality level is different. In this example, the maximum quality level for user equipment 180 is lower than for user equipment 170, wherefore user equipment 180 may not access data content item version storage 140. Rather, in phase 4210, user equipment 180 requests version 150, an identifier of which is included in the offer of phase 4210.

Figure 5:
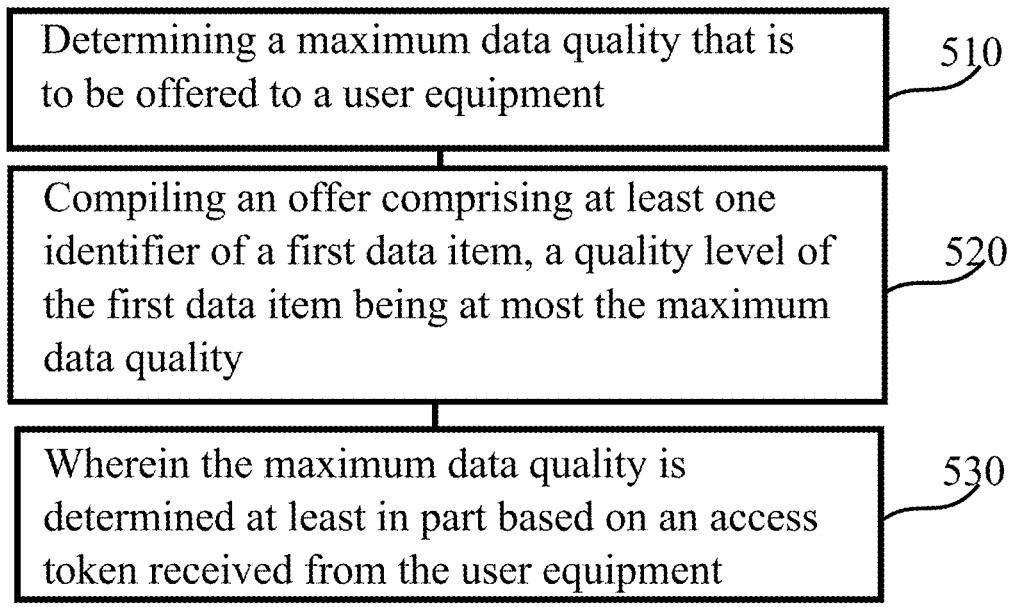
FIG. 5 is a first flow graph of a first method in accordance with the invention.

FIG. 5 is a first flow graph of a first method in accordance with the invention. The phases of the illustrated method may be performed in server 110, for example. Phase 510 comprises determining a maximum data quality that is to be offered to a user equipment. Phase 520 comprises compiling an offer comprising at least an identifier of a first data item, a quality level of the first data item being at most the maximum data quality. In the illustrated method, the maximum data quality may be determined at least in part based on an access token received from the user equipment.

Figure 6:
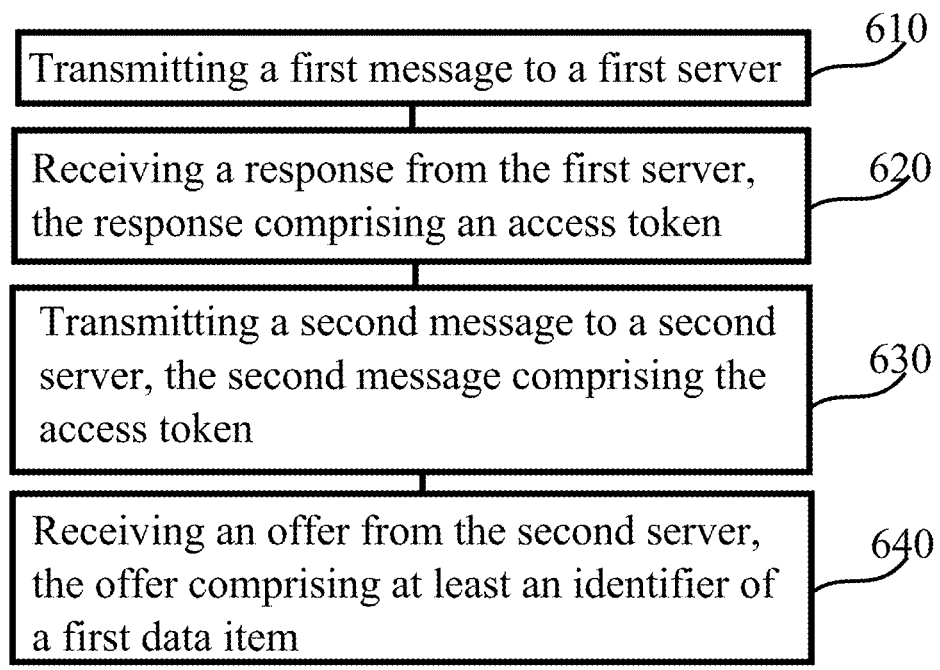
FIG. 6 is a second flow graph of a second method in accordance with the invention.

FIG. 6 is a second flow graph of a second method in accordance with the invention. The phases of the illustrated method may be performed in user equipment 170 or 180, for example. Phase 610 comprises transmitting a first request message to a first server. Phase 620 comprises receiving a response from the first server, the response comprising an access token. Phase 630 comprises transmitting a second request message to a second server, the second request message comprising the access token. Finally, phase 640 comprises receiving an offer from the second server, the offer comprising at least an identifier of a first data item.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising at least one processing core, at least one memory including computer program code, the at least one memory and the computer program code being configured to, with the at least one processing core, cause the apparatus at least to:

determine a maximum data quality that is to be offered to a user equipment; and compile an offer comprising at least an identifier of a first data item, a quality level of the first data item being at most the maximum data quality, wherein the maximum data quality is determined at least in part based on an access token received from the user equipment, the access token comprising an indication of the maximum data quality and wherein the access token is encrypted with one of a public key and a secret key, and wherein the identifier is included in the offer according to a subscription level or rank of the user equipment.

2. An apparatus according to claim 1, wherein the at least one memory and the computer program code are configured to, with the at least one processing core, further cause the apparatus to verify the access token before determining the maximum data quality.

3. An apparatus according to claim 2, wherein the at least one memory and the computer program code are configured to, with the at least one processing core, cause the apparatus to verify the access token by inquiring from a first server, whether the first server has issued the token.

4. An apparatus according to claim 2, wherein the at least one memory and the computer program code are configured to, with the at least one processing core, cause the apparatus to verify the access token by checking whether the access token satisfies a mathematical criterion.

5. An apparatus according to claim 4, wherein the mathematical criterion comprises that the access token has a valid cryptographic signature.

6. An apparatus according to claim 1, wherein the at least one memory and the computer program code are configured to, with the at least one processing core, cause the apparatus to determine the maximum data quality based at least in part on a message exchange with a second server, the message exchange comprising transmission of the access token from the apparatus to the second server and receipt from the second server of a service class indication.

7. An apparatus according to claim 1, wherein the at least one memory and the computer program code are configured to, with the at least one processing core, cause the apparatus to include in the offer a plurality of identifiers of data items, each identifier relating to exactly one data item.

8. An apparatus according to claim 7, wherein no data item the identifier of which is included in the offer has a data quality superior to the data quality of the first data item.

9. An apparatus comprising at least one processing core, at least one memory including computer program code, the at least one memory and the computer program code being configured to, with the at least one processing core, cause the apparatus at least to:
determine a maximum data quality that is to be offered to a user equipment; and
compile an offer comprising at least an identifier of a first data item, a quality level of the first data item being at most the maximum data quality,
wherein the maximum data quality is determined at least in part based on an access token received from the user equipment, and
wherein the identifier of the first data item comprises a hyperlink to the first data item.

10. A method comprising:
determining a maximum data quality that is to be offered to a user equipment; and
compiling an offer comprising at least an identifier of a first data item, a quality level of the first data item being at most the maximum data quality,
wherein the maximum data quality is determined at least in part based on an access token received from the user equipment, the access token comprising an indication of the maximum data quality and wherein the access token is encrypted with one of a public key and a secret key, and
wherein the identifier is included in the offer according to a subscription level or rank of the user equipment.

11. A method according to claim 10, further comprising verifying the access token before determining the maximum data quality.

12. A method according to claim 11, wherein verifying the access token comprises inquiring from a first server, whether the first server has issued the token.

13. A method according to claim 11, wherein verifying the access token comprises checking whether the access token satisfies a mathematical criterion.

14. A method according to claim 13, wherein the mathematical criterion comprises that the access token has a valid cryptographic signature.

15. A method according to claim 10, wherein determining the maximum data quality is based at least in part on a message exchange with a second server, the message exchange comprising transmission of the access token from the apparatus to the second server and receipt from the second server of a service class indication.

16. A method according to claim 10, comprising including in the offer a plurality of identifiers of data items, each identifier relating to exactly one data item.

17. A method according to claim 16, wherein no data item the identifier of which is included in the offer has a data quality superior to the data quality of the first data item.

18. A method comprising:
determining a maximum data quality that is to be offered to a user equipment; and
compiling an offer comprising at least an identifier of a first data item, a quality level of the first data item being at most the maximum data quality,
wherein the maximum data quality is determined at least in part based on an access token received from the user equipment, and
wherein the identifier of the first data item comprises a hyperlink to the first data item.

19. A non-transitory computer readable medium having stored thereon a set of computer readable instructions that, when executed by at least one processor, cause an apparatus to at least:
determine a maximum data quality that is to be offered to a user equipment; and
compile an offer comprising at least an identifier of a first data item, a quality level of the first data item being at most the maximum data quality,
wherein the maximum data quality is determined at least in part based on an access token received from the user equipment, the access token comprising an indication of the maximum data quality and wherein the access token is encrypted with one of a public key and a secret key, and
wherein the identifier is included in the offer according to a subscription level or rank of the user equipment.

* * * * *